United States Patent
Hoke et al.

(10) Patent No.: US 9,758,015 B2
(45) Date of Patent: Sep. 12, 2017

(54) VEHICLE COMFORT SYSTEM WITH EFFICIENT COORDINATION OF COMPLEMENTARY THERMAL UNITS

(71) Applicant: FORD GLOBAL TECHNOLOGIES, LLC, Dearborn, MI (US)

(72) Inventors: Paul B. Hoke, Plymouth, MI (US); Johnathan A. Line, Northville, MI (US); Gary A. Dage, Franklin, MI (US); Robert S. Sawyer, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 257 days.

(21) Appl. No.: 14/837,392

(22) Filed: Aug. 27, 2015

(65) Prior Publication Data
US 2015/0360538 A1    Dec. 17, 2015

Related U.S. Application Data

(62) Division of application No. 13/158,940, filed on Jun. 13, 2011, now Pat. No. 9,150,132.

(51) Int. Cl.
*B60H 1/00* (2006.01)
*B60N 2/00* (2006.01)
*B60N 2/56* (2006.01)

(52) U.S. Cl.
CPC ..... *B60H 1/00742* (2013.01); *B60H 1/00285* (2013.01); *B60H 1/00292* (2013.01);
(Continued)

(58) Field of Classification Search
CPC combination set(s) only.
See application file for complete search history.

(56) References Cited

U.S. PATENT DOCUMENTS

| 4,538,760 A | 9/1985 | Kobayashi |
|---|---|---|
| 5,054,686 A | 10/1991 | Chuang |
| (Continued) | | |

OTHER PUBLICATIONS

Yadolla Farzaneh, et al., Intelligent Control of Thermal Comfort in Automobile, Department of Mechanical Engineering Ferdowsi University of Mashhad, Iran, 2008, 5 pgs.

*Primary Examiner* — Yonel Beaulieu
(74) *Attorney, Agent, or Firm* — Vichit Chea

(57) ABSTRACT

An HVAC comfort system operates in a cabin of a vehicle. A plurality of vehicle status parameters are measured including a cabin temperature and a seat occupancy configuration. The method detects whether the vehicle status parameters correspond to a predetermined override state. When the vehicle status parameters correspond to the predetermined override state, then a respective mandated setting is automatically activated. Unless prevented by the mandated setting, one of a plurality of HVAC modes is automatically selected in response to the cabin temperature and other inputs, wherein the HVAC modes include an extremity heating mode and a panel circulation mode. The extremity heating mode is comprised of automatic activation of a touchpoint heated surface and other outputs in response to the seat occupancy configuration. The panel circulation mode is comprised of automatic activation of one or more zones for convective cooling in response to the seat occupancy configuration and may include activating other cooling devices.

10 Claims, 4 Drawing Sheets

(52) U.S. Cl.
CPC ..... *B60H 1/00764* (2013.01); *B60H 1/00785* (2013.01); *B60H 1/00835* (2013.01); *B60H 1/00849* (2013.01); *B60H 1/00878* (2013.01); *B60N 2/002* (2013.01); *B60N 2/56* (2013.01); *B60N 2/5628* (2013.01)

(56) References Cited

U.S. PATENT DOCUMENTS

| | | |
|---|---|---|
| 5,553,661 A | 9/1996 | Beyerlein et al. |
| 5,878,809 A | 3/1999 | Heinle |
| 6,216,956 B1 | 4/2001 | Ehlers et al. |
| 6,237,675 B1* | 5/2001 | Oehring .............. B60H 1/00285 165/288 |
| 6,454,178 B1 | 9/2002 | Fusco et al. |
| 6,672,085 B1 | 1/2004 | Sangwan et al. |
| 6,675,085 B2* | 1/2004 | Straub ................ B60K 31/0058 180/170 |
| 6,886,352 B2 | 5/2005 | Yoshinori et al. |
| 6,965,813 B2 | 11/2005 | Granqvist et al. |
| 7,506,938 B2* | 3/2009 | Brennan ................... A47C 7/74 297/180.13 |
| 7,578,552 B2* | 8/2009 | Bajic .................... B60N 2/5635 297/184.12 |
| 7,743,651 B2 | 6/2010 | Wakahara et al. |
| 8,360,517 B2* | 1/2013 | Lazanja ............... B60N 2/5635 297/180.12 |
| 9,150,132 B2* | 10/2015 | Hoke ................. B60H 1/00285 |
| 2003/0039298 A1* | 2/2003 | Eriksson ............ B60H 1/00785 374/109 |
| 2007/0114292 A1 | 5/2007 | Breed et al. |
| 2009/0000778 A1* | 1/2009 | Nathan .............. B60H 1/00735 165/202 |
| 2009/0078781 A1* | 3/2009 | Kanemaru ......... B60H 1/00742 236/49.3 |
| 2009/0301116 A1 | 12/2009 | Nathan et al. |

* cited by examiner

VEHICLE COMFORT SYSTEM WITH EFFICIENT COORDINATION OF COMPLEMENTARY THERMAL UNITS

CROSS REFERENCE TO RELATED APPLICATIONS

This application is a division of U.S. application Ser. No. 13/158,940, filed Jun. 13, 2011.

STATEMENT REGARDING FEDERALLY SPONSORED RESEARCH

Not Applicable.

BACKGROUND OF THE INVENTION

The present invention relates in general to automotive heating, ventilating, and air conditioning (HVAC) systems, and, more specifically, to a system and method for coordinating multiple heating and cooling devices to provide thermal comfort to vehicle occupants in a manner that optimizes energy expenditure.

Thermal comfort has been provided in conventional automotive vehicles using a forced-air central HVAC system. Supplemental devices such as heated seats, cooled seats, heated steering wheels, or partitioned climate zones have become available for increasing comfort.

Even when included as standard equipment, control of supplemental devices has not been integrated with the main HVAC system. Thus, the user must manually attend to each standalone device in an attempt to balance the overall comfort provided by all the devices working together. Besides causing undesirable distraction, it is unlikely that the devices can all be manually set such that the most effective operation is obtained.

Energy usage in the vehicle to obtain a comfortable climate is becoming an important issue. As one consequence of creating vehicles with higher energy efficiency, total energy available for the HVAC system has become more restricted. In vehicles with internal combustion engines, the engines have become smaller and more thermally efficient. In full electric and hybrid electric vehicles, electrically-driven heaters are required as heat sources. Battery life and vehicle range may be severely compromised in cold weather when electrical heating is employed. Likewise, compressor loads in an AC system in an electric vehicle will consume a greater portion of the vehicle energy budget as powertrains become more efficient.

Providing thermal comfort to vehicle occupants requires manufacturers to design comfort systems that integrate key vehicle systems with intelligent controls to take advantage of different vehicle usage patterns. Minimizing vehicle thermal loads and HVAC energy usage and taking advantage of physiological sensations in ways that reduce energy usage are essential to maximizing fuel economy while meeting customer comfort expectations.

SUMMARY OF THE INVENTION

Heat can be transported by the mechanisms of conduction, convection, and radiation. Thermal units working by conduction include, without limitation, heated/cooled seats, heated/cooled steering wheels, and heated/cooled transmission shift levers. These are referred to herein as touchpoint devices since they work by direct contact with the occupant. They can have a large impact on the perceived comfort level. Thermal units working by convection include the main HVAC air handling system having a blower delivering air through one or more heat exchangers (such as an air conditioning evaporator and/or a heater core). Radiative thermal units may include active infrared heaters such as IR diodes or passive devices such as infrared-reflective window glass.

Under conditions when thermal demand is highest (i.e., the actual temperature to which the occupant is exposed is farthest from the desired, target temperature), it has been discovered that directing a higher relative proportion of energy into touchpoint thermal devices achieves the greatest comfort benefit at the highest energy efficiency (especially when providing warmth in a cold vehicle). Coordination between the main forced-air components and the touchpoint devices across all conditions greatly reduces energy use while maintaining occupant comfort. The invention enables the physiological impacts of various devices to be taken into account when determining how to utilize the available energy for heating or cooling (e.g., a cooled steering wheel may have less physiological benefit for perceived cooling than a heated steering wheel has for perceived warming). By including physiological aspects, it becomes possible to tradeoff certain parameters to achieve comfort while minimizing energy usage, e.g., it is sometimes acceptable to allow a temperature over the target temperature if airflow is simultaneously increased.

In one aspect of the invention, a method is provided for operating an HVAC comfort system in a cabin of a vehicle. A plurality of vehicle status parameters are measured including a cabin temperature and a seat occupancy configuration. The method detects whether the vehicle status parameters correspond to a predetermined override state. When the vehicle status parameters correspond to the predetermined override state, then a respective mandated setting is automatically activated. Unless prevented by the mandated setting, one of a plurality of HVAC modes is automatically selected in response to the cabin temperature, wherein the HVAC modes include an extremity heating mode and a panel circulation mode. The extremity heating mode is comprised of automatic activation of a touchpoint heated surface in response to the seat occupancy configuration. The extremity heating mode may also include convective or radiative heating devices. The panel circulation mode is comprised of automatic activation of one or more zones for convective cooling in response to the seat occupancy configuration. The panel circulation mode may also include activation of a touchpoint cooled surface and/or the cooling of other surfaces in the vehicle (which would reduce radiative heating of the occupant by those surfaces).

DETAILED DESCRIPTION OF PREFERRED EMBODIMENTS

Figure 1:
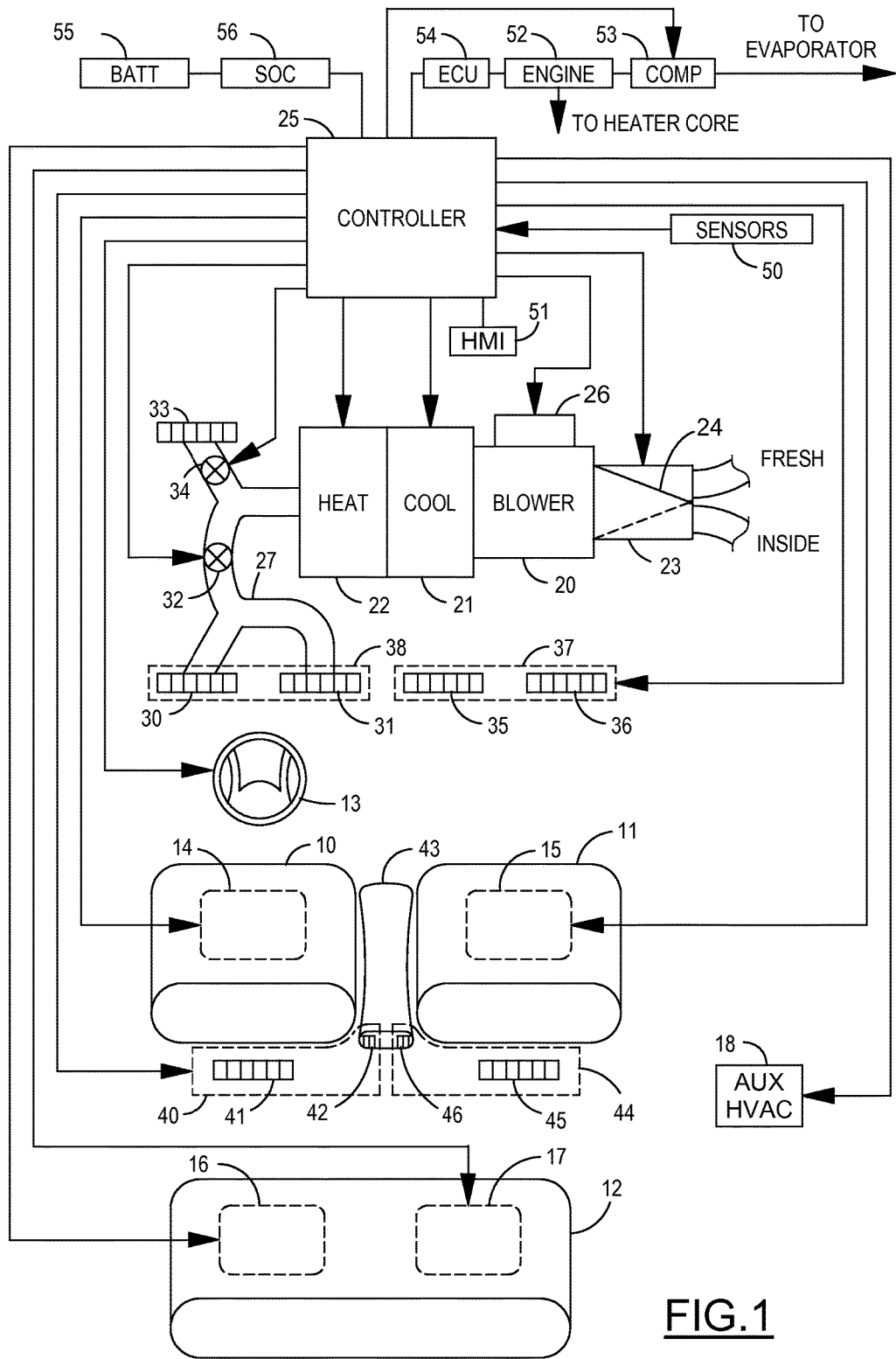
FIG. 1 is a block diagram of one embodiment of a system of the present invention.

Referring now to FIG. 1, an automotive vehicle includes a driver seat 10, a passenger seat 11, and a rear seat 12

(which may be a bench seat, rear bucket seats, or a third row seat). A steering wheel 13 located in front of driver seat 10 includes an internal heat source on the surfaces contacted by the driver's hands (i.e., a touchpoint surface). A known manner of heating steering wheel 31 may be used such as electrical resistance heating based on a positive temperature coefficient (PTC) material built into the steering wheel.

Additional touchpoint surfaces are preferably included in seats 10-12 to conduct heat to or from the occupants. Specifically, seat thermal units 15-17 can provide heating and/or cooling using known methods such as integral resistive heating elements, integrated chillers, or thermoelectric devices. In addition, an auxiliary HVAC 18 could alternatively be used to heat or cool one or more touchpoint surfaces.

The vehicle includes a forced-air HVAC system having a blower 20, a cooling heat exchanger 21 such as an evaporator, and a heat exchanger 22 such as a heater core. Blower 20 receives air via a blend unit 23 having a door 24 controllably positioned to select relative proportions of either fresh air or inside air. The position of door 24 is known as a recirculation position. It is determined by a controller 25 which also controls a blower motor 26 to determine the blower speed. Heat exchangers 21 and 22 may likewise be controlled by controller 25 so that air can be heated or cooled by driving it through heat exchangers 21 and 22 by blower 20 to flow into duct 27 for delivery to various registers.

The registers include driver registers 30 and 31. The amount of air flow to registers 30 and 31 may be adjusted by a control valve (i.e., damper) 32 under control of controller 25. Similarly, forced-air can be delivered to a defrost register 33 via a valve 34. Front-seat passenger registers 35 and 36 receive forced air via additional ducts (not shown). The ducts include additional dampers (now shown) so that respective zones of forced air 37 and 38 can be selectably controlled by controller 25. Only some of the registers, inlets, and outlets of a typical climate system are shown in FIG. 1.

Forced air zones may also be provided for rear seat passengers including a zone 40 having a register 41 (which may be installed in a floor or ceiling), and a register 42 which may be installed in a console 43. A second rear seat zone 44 is created using registers 45 and 46.

Controller 25 coordinates operation of all the thermal devices by adopting various HVAC modes to efficiently provide comfort for the occupants. Controller 25 is coupled to a plurality of sensors 50 which measure a plurality of vehicle status parameters including cabin temperature, cabin humidity, a seat occupancy configuration, outside temperature, outside humidity, cabin pollutant level (such as $CO_2$ level), sun location, sun intensity, and any other parameters useful for determining occupant comfort. A human machine interface (HMI) 51 such as a control panel is connected to controller 25 to allow an occupant to specify a target temperature setting and to generate other commands associated with the HVAC system.

In an internal combustion vehicle, an engine 52 generates the energy for operating the thermal units (which may include thermal waste heat or mechanical or electrical energy). For heating, the thermal units include a supply of heated coolant that circulates from the engine to a heater core. For cooling, the thermal units include a compressor 53 providing a refrigerant to an evaporator. An engine control unit (ECU) 54 controls engine operation and is connected to controller 25 to communicate vehicle status parameters such as a vehicle speed and an engine status.

In an electric vehicle and for some thermal units in an internal combustion vehicle, energy for operating the thermal devices may be provided by a battery 55. A state-of-charge (SOC) circuit 56 provides a battery state-of-charge vehicle status parameter to controller 25 together with other parameters that may be used to define the energy state of battery 55.

Figure 2:
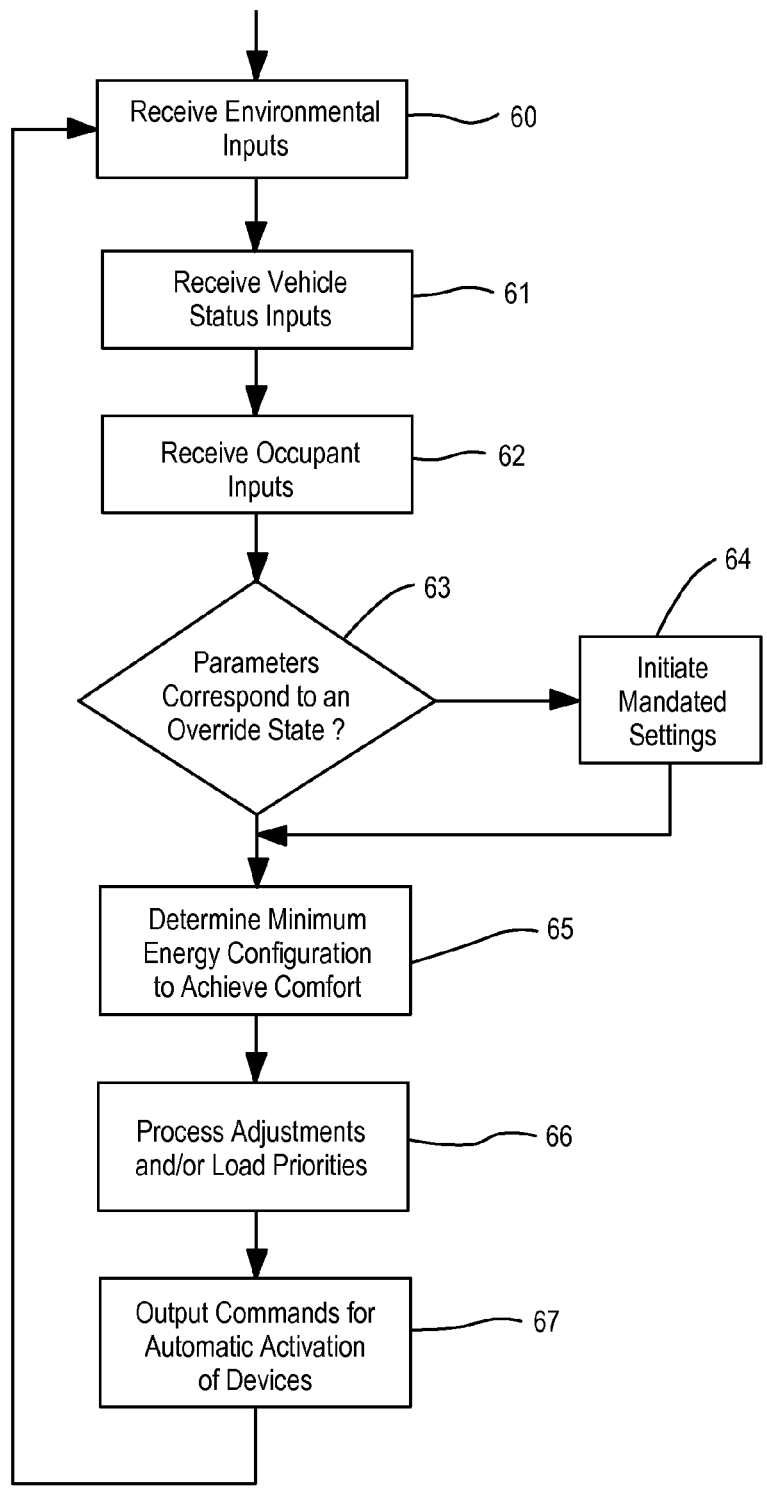
FIG. 2 is a general flowchart showing one method of the present invention.

Controller 25 is configured to operate all the thermal units and associated devices in the HVAC system based on various vehicle status parameters so that the touchpoint heated or cooled surfaces and the forced-air supplied to the occupants achieves optimal comfort and minimal energy consumption. In particular, controller 25 may preferably operate according to a general method shown in FIG. 2. The method starts in step 60 wherein environmental inputs are received by the controller. The environmental inputs may include inside and outside temperature and humidity, solar intensity and position, and others. In step 61, the controller receives vehicle status inputs such as engine coolant temperature, battery state-of-charge, and engine status. In step 62, the controller receives occupant inputs to determine a seat occupancy configuration. Seat occupancy sensors may include seat load sensors, seatbelt buckle sensors, manually-operated input switches, and other known means for determining which seats contain an occupant.

In step 63, the controller checks to determine whether the vehicle status parameters correspond to an override state. The override states correspond to any special cause having some overriding priority that is used to prevent the controller from merely optimizing comfort and economy. Overriding priorities may include safety or capability of the vehicle to reach a destination, for example. One special cause may be a frosted or fogged windshield or other window pane which must be defrosted or defogged for safe driving. Another example may include pollution or contamination in the cabin air such as accumulation of carbon dioxide. Another special cause relates to an engine status or battery state-of-charge corresponding with degraded powertrain performance known as a limp-home mode.

If an override state is detected in step 63, then corresponding mandated settings are initiated by the controller in step 64. In the case of a frosted or fogged window, the mandated settings may include forced-air heating being supplied to defrost registers and/or the activation of embedded window-heating elements. In the case of air pollution or contamination (such as may be detected when a $CO_2$ sensor indicates $CO_2$ concentrations above a predetermined concentration), the mandated settings may include decreasing the recirculation position of the blower input so that increased fresh air is drawn into the passenger cabin. The ratio of fresh air to recirculated air may be increased by a fixed amount or, alternatively, the blend may be set to a predetermined value such as 100% fresh air. In the event of an engine malfunction or fault resulting in a limp-home mode, the mandated settings may include deactivation of at least a portion of the HVAC comfort system, such as turning off of all air conditioning functions.

If no override state is detected in step 63, or after any mandated settings are made in step 64, the controller determines a minimum energy configuration to achieve occupant comfort in step 65. In the event that mandated settings have been initiated, those settings would be undisturbed by any configuration commands made in step 65. In other words, the automatic selection of an HVAC mode and activation of particular thermal devices are only made if not prevented by any mandated settings.

Figure 3:
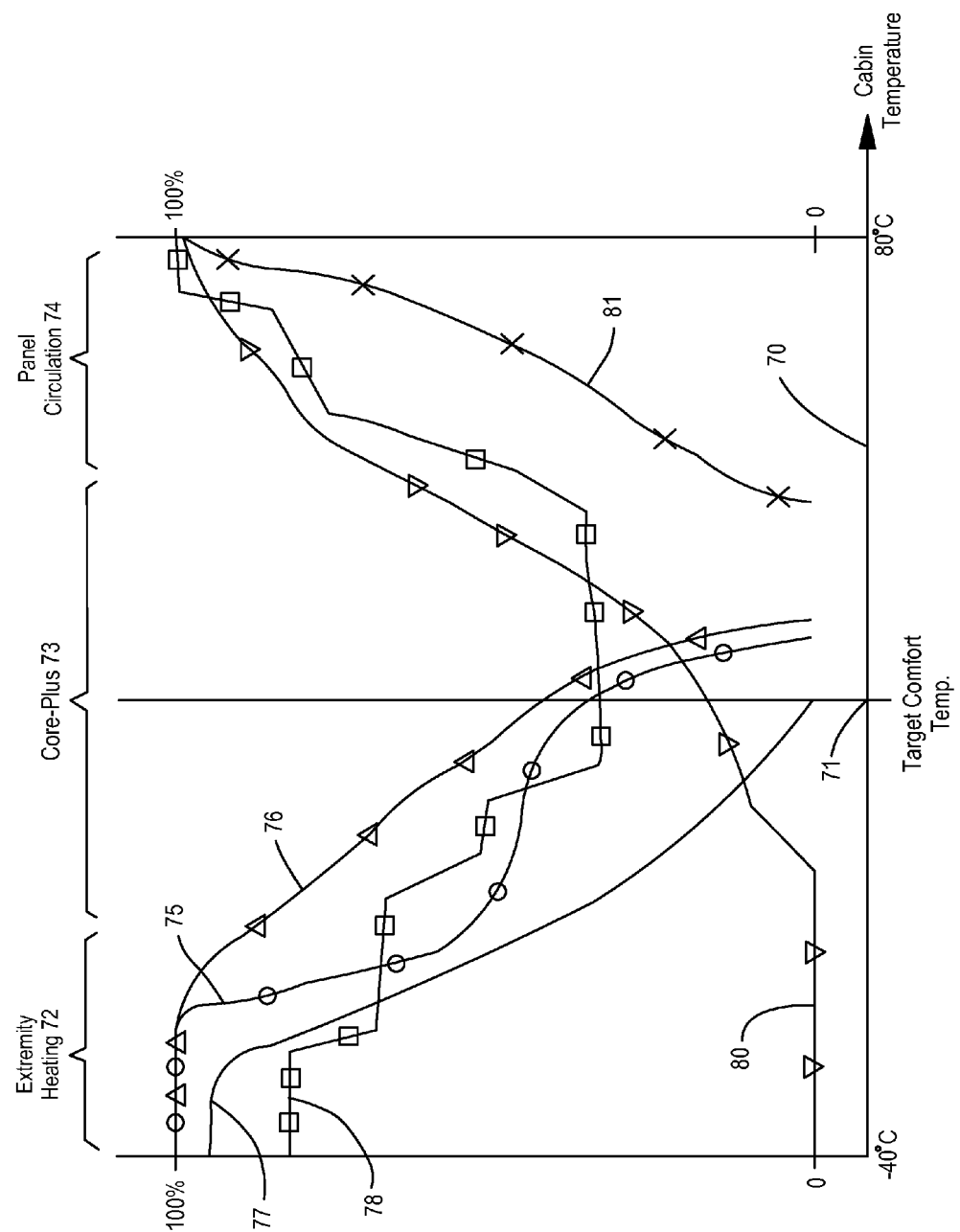
FIG. 3 is a plot showing automatic activation of various thermal devices according to different HVAC modes used in the present invention.

The optimum HVAC configuration may be determined by accessing one or more look up tables (LUTs) or by evaluating algorithms correlating various vehicle status parameters to respective commanded values for various control signals used in the HVAC comfort system. A potential relationship between the vehicle status parameters and the commanded output that can be built into a LUT and/or algorithmic model is shown in FIG. 3 and will be described in more detail below. The HVAC configuration including any commanded values determined from the LUTs or models are taken as initial or default values that may be altered by processing adjustments and/or load priorities in step 66. After the adjustments, commands for automatic activation of various devices are output in step 67.

FIG. 3 shows example relationships between adjustable levels of various device settings in response to cabin temperature. The cabin temperature may range from −40° C. to 80° C. along an axis 70, for example. A predetermined target temperature or a user defined target temperature 71 may be at about 22° C. Operation of the HVAC comfort system generally falls into three modes at different cabin temperatures, including an extremity heating mode 72, a core-plus mode 73, and a panel circulation mode 74. At the coldest temperatures in the extremity heating mode 72, emphasis is on maximum heat delivery via conductive thermal units resulting in sufficient warming of the occupant's extremities. In core-plus mode 73 over a mid-temperature range, all the devices of the comfort system may be operated at relatively low energy in order to thermally condition each occupants' body core plus their extremities. In the panel circulation mode 74 at the highest temperatures, airflow is the most important element of perceived comfort of the occupant's core plus extremities. Therefore, air circulation via the instrument panel registers is emphasized in panel circulation mode 74.

Extremity heating mode 72 is comprised of automatic activation of a touchpoint heated surface in response to the seat occupancy configuration. Thus, for those seats containing an occupant and having a touchpoint heating unit therein, the touchpoint heating surface is activated to a high level as shown by a trace 75 in FIG. 3. If so equipped, a heated steering wheel would also be activated as shown along a trace 76. At the lowest temperatures, both the heated seats and heated steering wheel would be activated at 100% power levels as a default value (this would also increase the load on the internal combustion engine to thereby generate more waste heat which can then be used for convective heat). With increasing temperature, the default power levels decrease until the touchpoint heating surfaces are deactivated at a temperature selected for providing comfort according to environmental conditions. Other heating devices such as a touchpoint heated shifter or console would be similarly controlled.

Extremity heating mode 72 may also include convective heating as appropriate. Trace 77 illustrates a magnitude of engine coolant flow directed to the heater core in the air handling unit. A maximum flow occurs at the lowest temperatures and decreases to a substantially zero flow at the target comfort temperature. Similarly, a blower speed shown by trace 78 has a default level at a high level (but less than maximum) for the lowest temperatures, and falls off as cabin temperature approaches the target comfort temperature. Throughout the extremity heating mode 72, a compressor speed or stroke shown by a trace 80 remains at zero. Across core-plus mode 73, compressor speed or stroke gradually increases and then reaches a high or maximum level in panel circulation mode 74.

The default blower speed may be at a minimum value at the target comfort temperature and throughout most of the core-plus mode 73. Blower speed increases across panel circulation mode 74 and reaches a maximum at the highest cabin temperatures. When the air circulation system includes separately controlled zones, energy consumption may be reduced by only directing conditioned air to occupied zones. At the highest cabin temperatures, it may be desirable to also supply cooled air to unoccupied zones to better achieve a comfortable temperature in the occupied zones.

A trace 81 shows activation of cooled seats in the panel circulation mode 74. Thus, the touchpoint cooled surfaces of occupied seats may be the last to be activated according to an efficient operation of the HVAC comfort system.

The curves shown in FIG. 3 are merely examples of desirable levels for the various commands. The corresponding levels may be stored in LUT or generated using predetermined algorithms. The various adjustments to the default values obtained from FIG. 3 may include certain reprioritization of loads or adjustments that take advantage of opportunities to reduce energy consumption or increase comfort. For example, the blower speed could be adjusted in response to vehicle speed. When the vehicle travels over a threshold speed, a ram effect in the outside fresh air intakes may provide sufficient flow to allow a reduction in the blower speed.

As another example of a tradeoff made as an adjustment to the default values, the controller may check for an engine coolant temperature being below a threshold temperature. Before the engine has reached a normal operating temperature, the coolant may contain insufficient heat to heat the cabin quickly. Thus, in response to the engine coolant temperature being below the threshold temperature, default values for operating the touchpoint heated surfaces may be increased while the default blower speed may be reduced.

Figure 4:
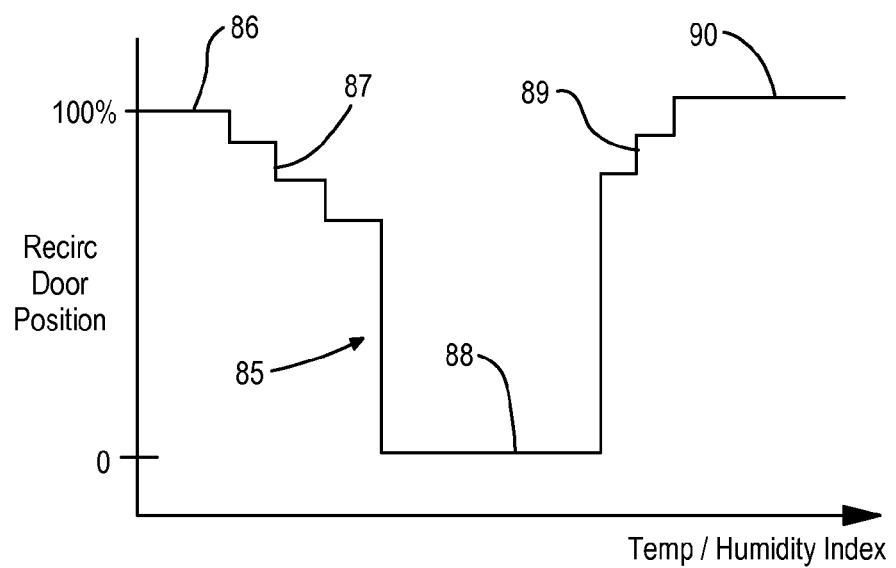
FIG. 4 is a plot showing the variability of recirculated air in one embodiment.

FIG. 4 shows another embodiment wherein a commanded recirculation level is determined in response to cabin temperature and/or a temperature-humidity index. A 100% recirculation level corresponds to a blend door setting that blocks fresh outside air and a 0% setting corresponds to the blower input receiving only fresh outside air. A trace 85 illustrates default levels wherein all internal air is recirculated at 86 when the temperature/humidity index is lowest. With increasing temperature/humidity, recirculation level is gradually decreased at 87. Around a target comfort range, recirculation may be set to a zero level at 88 when the outside temperature and humidity correspond closely to the desired cabin conditions (which would enable a higher blower setting for increased perception of cooling while consuming less energy to run the blower). At a higher temperature/humidity index, the recirculation setting is increased at 89 and corresponds to 100% at location 90 in trace 85. The default values obtained from FIG. 4 may be adjusted according to either humidity concerns or pollution concerns. Thus, the recirculation position may be decreased in proportion to the cabin humidity or in proportion to a cabin pollution level, for example. In addition, various optimization algorithms may be included wherein inside and outside humidity levels, and inside and outside temperature levels, may indicate that the use of fresh outside air can quickly improve the comfort level inside the passenger cabin regardless of other variables. Additionally, when interior air contamination indicated by a $CO_2$ sensor exceeds a predetermined level, then a recirculation position obtaining maximum fresh air may be selected as described above.

What is claimed is:

1. A method of operating an HVAC comfort system in a cabin of a vehicle, wherein the HVAC comfort system includes a plurality of touchpoint heated surfaces each delivering heat conductively to an occupant of a respective seat, a plurality of touchpoint cooled surfaces each removing heat conductively from an occupant of a respective seat, and an air handling unit for distributing conditioned air toward selected zones corresponding to respective seats, wherein the air handling unit includes a blower, a thermal heating unit, and a thermal cooling unit, the method comprising the steps of:

measuring a plurality of vehicle status parameters including a cabin temperature and a seat occupancy configuration;

detecting whether the vehicle status parameters correspond to a predetermined override state;

when the vehicle status parameters correspond to the predetermined override state, then automatically activating a respective mandated setting of the HVAC comfort system;

unless prevented by the mandated setting, automatically selecting one of a plurality of HVAC modes in response to the cabin temperature, wherein the HVAC modes include an extremity heating mode selected when the cabin temperature is below a first predetermined temperature, a panel circulation mode selected when the cabin temperature is above a second predetermined temperature, and a core-plus mode selected when the cabin temperature is above the first predetermined temperature and below the second predetermined temperature;

wherein the extremity heating mode is comprised of automatic activation of at least one touchpoint heated surface in response to the seat occupancy configuration, wherein the extremity heating mode includes automatic activation of the thermal heating unit, and wherein the heat delivery by the touchpoint heated surfaces is greater than the heat delivery by the thermal heating unit of the air handling unit;

wherein the panel circulation mode is comprised of automatic activation of the thermal cooling unit for one or more zones for convective cooling in response to the seat occupancy configuration, wherein the panel circulation mode includes automatic activation of at least one touchpoint cooled surface in response to the seat occupancy configuration, and wherein the heat removal by the thermal cooling unit of the air handling unit is greater than the heat removal by the touchpoint cooled surfaces; and wherein the core-plus mode is comprised of automatic activation of the blower at a selected speed determined in response to the cabin temperature, wherein the selected speed is less than a maximum speed of the variable speed blower and reaches a minimum predetermined speed when the cabin temperature equals a target temperature, and wherein the core-plus mode includes gradually increasing heat removal by the thermal cooling unit and gradually decreasing heat delivery by the touchpoint heated surfaces in response to increasing cabin temperature.

2. The method of claim 1 wherein one of the vehicle status parameters is an engine coolant temperature, wherein the thermal heating unit is comprised of a heater core, wherein the automatic activation of the touchpoint heated surface includes a default energy consumption, and wherein the method further comprises the steps of:

comparing the engine coolant temperature to a predetermined threshold; and if the engine coolant temperature is less than the predetermined threshold, then increasing the energy consumption of the touchpoint heated surface above the default energy consumption.

3. The method of claim 1 wherein one of the vehicle status parameters is vehicle speed, and wherein the selected speed of the blower is reduced when vehicle speed is above a threshold speed.

4. The method of claim 1 wherein the HVAC comfort system includes a blower input damper for providing a selectable recirculation position between 0% and 100%, wherein the extremity heating mode and the panel circulation mode provide respective default recirculation positions.

5. The method of claim 4 wherein one of the vehicle status parameters is cabin humidity, and wherein the method further comprises the step of:

decreasing the selected recirculation position in proportion to the cabin humidity.

6. The method of claim 4 wherein one of the vehicle status parameters is cabin pollution level, and wherein the method further comprises the step of:

decreasing the selected recirculation position in proportion to the cabin pollution level.

7. The method of claim 1 wherein the vehicle status parameters are selected from a group comprising engine coolant temperature, battery state-of-charge, outside temperature, outside humidity, cabin humidity, cabin pollutant level, sun location, sun intensity, user target setting, vehicle speed, and engine status.

8. The method of claim 1 wherein the vehicle status parameters include at least one of a battery state-of-charge and an engine status, wherein the predetermined override state is comprised of a limp-home state, and wherein the respective mandated setting forces deactivation of at least a portion of the HVAC comfort system.

9. The method of claim 1 wherein the vehicle status parameters include a cabin pollutant level, wherein the predetermined override state is comprised of a purge state when the cabin pollutant level is above a predetermined level, and wherein the respective mandated setting forces the HVAC comfort system to introduce fresh outside air to the cabin.

10. The method of claim 9 wherein the cabin pollutant level is comprised of a measurement of $CO_2$ concentration.

* * * * *